United States Patent
Hogan et al.

(10) Patent No.: US 10,283,989 B1
(45) Date of Patent: May 7, 2019

(54) ELECTRICAL POWER CONVERTER AND DETACHABLE ENERGY STORAGE RESERVOIR

(71) Applicant: Apple Inc., Cupertino, CA (US)

(72) Inventors: Roderick B. Hogan, San Francisco, CA (US); Evan D. Ragsdale, Milpitas, CA (US); Nathan A. Johanningsmeier, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/884,092

(22) Filed: Jan. 30, 2018

(51) Int. Cl.
| | |
|---|---|
| *H02J 7/00* | (2006.01) |
| *H02M 3/00* | (2006.01) |
| *H04R 3/00* | (2006.01) |
| *H04R 29/00* | (2006.01) |
| *H02J 7/34* | (2006.01) |

(52) U.S. Cl.
CPC ........... *H02J 7/0052* (2013.01); *H02M 3/00* (2013.01); *H04R 3/00* (2013.01); *H04R 29/001* (2013.01); *H02J 7/345* (2013.01)

(58) Field of Classification Search
None
See application file for complete search history.

(56) References Cited

U.S. PATENT DOCUMENTS

| 6,956,417 B2 | 10/2005 | Bernstein et al. |
| 9,231,543 B2 | 1/2016 | Hogan et al. |
| 2014/0043034 A1* | 2/2014 | Hemon ............... B60R 21/0173 324/503 |
| 2015/0270776 A1* | 9/2015 | Mallik ................ H02M 3/156 307/31 |

OTHER PUBLICATIONS

"TPA2025D1 2-W Constant Output Power Class-D Audio Amplifier With Class-G Boost Converter and Battery Tracking AGC," Texas Instruments, Aug. 1, 2011, 29 pages.

* cited by examiner

*Primary Examiner* — Paul W Huber
(74) *Attorney, Agent, or Firm* — Womble Bond Dickinson (US) LLP (57) ABSTRACT

A power converter provides a first output voltage and a second output voltage in accordance with a control input, wherein the first output voltage is higher than the second output voltage. A switch that is series coupled between i) an energy reservoir node and ii) a power supply node or a power return node. A charge maintenance circuit is coupled to the energy reservoir node, and when the switch is closed can maintain a selected amount of charge in or a selected voltage across an energy reservoir element that may be coupled to the energy reservoir node. Other aspects are also described and claimed.

19 Claims, 4 Drawing Sheets

ELECTRICAL POWER CONVERTER AND DETACHABLE ENERGY STORAGE RESERVOIR

FIELD

An aspect of the disclosure here relates to battery-based power supplies for audio power amplifiers. Other aspects are also described.

BACKGROUND

Modern portable audio systems such as smartphones, tablet computers, and smart speakers, present unique challenges when seeking to increase their audio output power. There are of course restrictions in the available physical volume inside their housings, which means that the audio subsystem components have to not only be small but also cope with limited heat dissipation capability. A further difficulty in producing a sufficiently loud and high quality sound, and especially music playback, is how to do so without rapidly depleting a limited power source, namely a rechargeable battery.

SUMMARY

To maintain sound output power in portable audio systems even when the battery is being depleted (its voltage is dropping), a boost converter can be used to boost the battery voltage to a boosted level (which supplies the audio amplifiers.) Power efficiency can be improved by using an adaptive boost converter. An adaptive boost converter automatically changes into boost mode only when the amplitude of audio output exceeds a selected threshold. When the amplitude is below the threshold, the boost converter is deactivated and is placed into a pass through mode, in which the audio amplifier is supplied directly from the battery.

To increase power efficiency during audio playback, one can dynamically change, or in accordance with the audio signal level, the power supply voltage to the audio amplifiers, between a boosted level and the lower, battery voltage. At low audio signal levels, the battery should be used to directly power the audio amplifiers, but during audio peaks the boost converter should be activated to supply the boosted (higher voltage) level to supply the audio amplifiers. This rapid switching between the boosted level and the supply (as a function of the audio signal level) not only significantly reduces the power that is "wasted" by the boost converter but also reduces switching losses in certain audio amplifiers, such as class D amplifiers (when the battery voltage is directly supplying the audio amplifiers.)

However, rapidly changing between boost mode and direct battery mode presents several problems, when supplying the audio amplifier using an energy storage reservoir element such as a reservoir capacitor. The energy storage capacitor is coupled to the output of the boost converter and serves to supply bursts of energy to the audio amplifier during audio peaks. Now, the relatively large amount of stored charge in the reservoir capacitor means that the boost converter output voltage will change slowly when transitioning between the boosted level and the battery voltage. This translates into an increase in power consumption, during the transition from direct battery mode to boost mode, until the reservoir has been charged back up to the boosted level.

In addition, at the beginning of a transition to the boosted level, e.g., when encountering an audio peak that requires a power supply voltage in excess of that which is possible using the battery voltage directly, there is a need to immediately ramp up the voltage across the reservoir capacitor. But since there may be a finite input power limit to the boost converter (for example to limit its peak draw from the battery), this ramp up interval may take a relatively long time interval. As a result, there may be a need to implement a large look-ahead buffer for the audio signal (which is being evaluated in order to detect in real-time the audio levels that are above the threshold.) As a result, the latency between the occurrence of an audio peak and when the boosted level is available to amplify it may be unacceptably long.

An aspect of the disclosure here is a method for supplying power to an audio amplifier of an audio system that may alleviate the above mentioned concerns that are associated with the dynamic changing of a boost converter with an energy storage reservoir element, between boost mode and direct battery mode. The method includes comparing a level of an input audio signal to a threshold, and in response to the level being greater than the threshold (e.g., a loud segment of the audio program) signaling a boost converter to boost a battery voltage to a boosted level at its output node. The output node may be directly coupled to a power supply node of an audio amplifier that is amplifying the input audio signal. This is boost mode, during which a reservoir capacitor is coupled (attached) to the boost converter, at the output of the boost converter in parallel with the audio amplifier, with the boosted (voltage) level across it. Next, in response to the audio signal level being lower than the threshold (e.g., a soft segment of the audio program), the boost converter is signaled to not boost the battery voltage and instead to enable the battery to directly supply the audio amplifier. This is the direct battery mode, during which the reservoir capacitor is decoupled (detached) from the audio amplifier and from the boost converter. In other words, the energy storage reservoir is attachable to and detachable from the output of the boost converter that is supplying power to the audio amplifier.

When the reservoir is detached and the battery voltage boost function is essentially disabled, the audio amplifier power supply voltage will fall down to the battery voltage, thereby reducing power consumption during soft segments of the audio program that is being outputted (played back). Also, while the reservoir is detached, the charge in the reservoir is maintained by a charge maintenance function. In the case of a reservoir capacitor, the voltage across the capacitor is maintained at the boosted level (while the capacitor is detached from the audio amplifier and from the boost converter.) Because the charge in the reservoir capacitor is maintained in this manner, the reservoir capacitor can be re-attached to the boost converter output immediately or whenever needed to output a loud segment of the audio program (which is a segment that requires a power supply voltage in excess of that which is possible using the battery alone to directly supply the audio amplifier). As a result, the transition interval for reattaching the reservoir may be shorter than an inherent delay of the digital to analog converter and audio amplifier that are outputting the audio signal, such that no additional look ahead buffer is needed for the audio signal (other than an amount needed for detecting loud segments.) Moreover, the additional power consumption that would have resulted from a slow ramp up of the voltage across the reservoir capacitor (when transitioning to the boosted level) is avoided, because the reservoir capacitor is maintained at a voltage higher than the battery voltage (e.g., the boosted level.)

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure here are now explained with reference to the appended drawings. Whenever the relative positions and other aspects of the elements described are not explicitly defined, the scope of the invention is not limited only to the elements shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description.

For small audio systems, one solution for avoiding a rapid depletion of a limited power source is to add an energy storage reservoir to the output of a power converter that is supplying power to the audio amplifiers. This reduces the input power crest factor of the power converter. This enables peak audio output power levels that are in excess of a system-imposed, input power constraint on the converter. It also allows the power stage components of the converter to be physically small. The solution enables high crest factor audio content such as music to be output at elevated volume levels. But an additional challenge remains namely how to further reduce the power consumption of the converter (that is supplying the audio amplifiers), due to the constraint of a limited power source (the rechargeable battery.)

Figure 1:
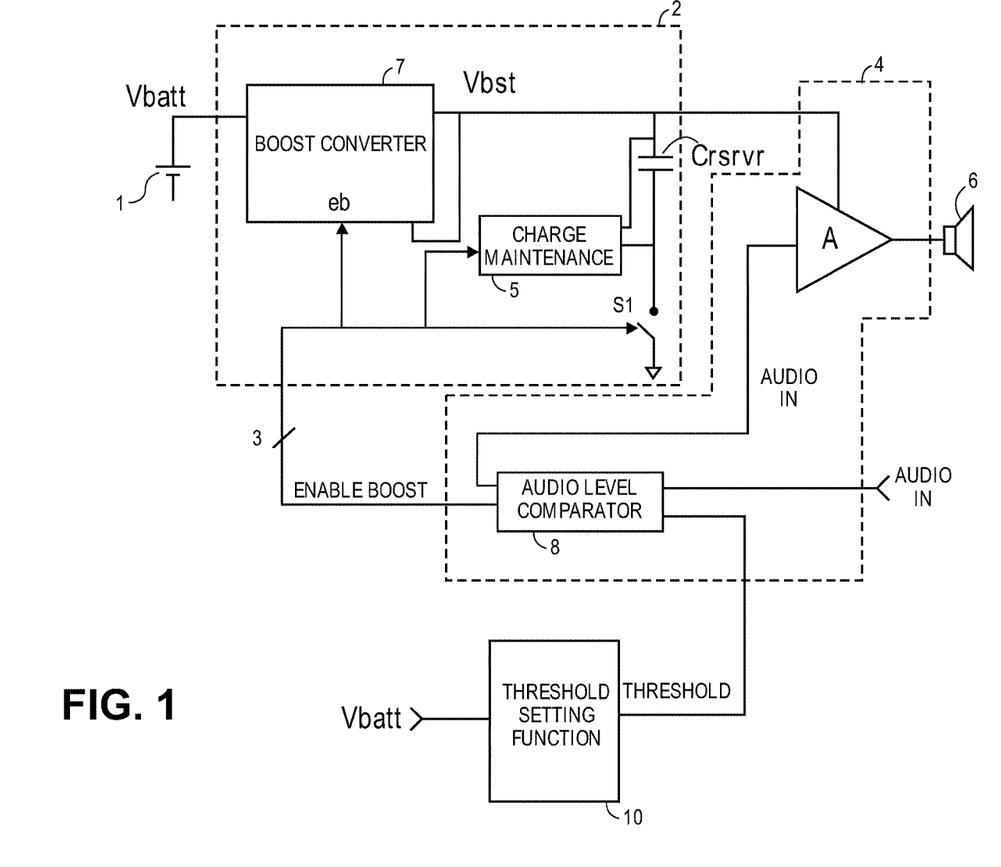
FIG. 1 is a combined block diagram and circuit schematic of an audio system.

FIG. 1 is a combined block diagram and circuit schematic of an example audio system. The audio system has a battery 1 as its power source, which has a battery voltage Vbatt. The term battery as used here also encompasses a fuel cell or other electrical energy storage device that may or may not be rechargeable. The battery 1 supplies power to an audio amplifier A through the latter's power supply node, while the audio amplifier A is configured to amplify an audio input signal, audio in, for purposes of audio output or playback through an acoustic output transducer or speaker 6. The audio input signal may be in the digital domain, just before it is fed to the amplifier A or converted into analog form for driving the speaker 6. Alternatively, the audio input signal may already be in analog form. The audio amplifier A may be a class D power amplifier or it may have another topology suitable for audio output through the speaker 6, as part of for example a portable consumer electronics device such as laptop computer, a tablet computer, a smartphone, or a smart loudspeaker.

The audio system has a boost converter 7 whose input power node is coupled to the battery 1, and an output power node (at voltage Vbst) that is coupled to the power supply node of the audio amplifier A. The boost converter 7 may be implemented as a switch mode power supply (smps) circuit having one or more phases, or it may be implemented as a charge-pump circuit. The boost converter has at least two modes of operation, including a boost mode and a direct battery mode. In boost mode, the boost converter 7 boosts the battery voltage Vbatt to a boosted level at its output power node Vbst that is higher than Vbatt. In direct battery mode, it is configured to enable the battery to directly supply current to the node Vbst. The boost mode may be used when the battery 1 is being depleted and so the battery voltage is deemed to be too low to directly supply the audio amplifier.

The boost converter 7 may be configured into a direct battery mode in any one of several ways. For example, a bypass path may be provided (in the converter 7) that when enabled allows the battery to directly supply current to the power supply node of the audio amplifier through the bypass path. Another example of direct battery mode is in an smps circuit, where a dc path is formed from the input of the converter that goes through the one or more phase inductors of the smps circuit (by properly setting the power stage switches of the smps circuits), and through which the battery to directly supply current to the power supply node of the audio amplifier A. As explained below, the configuration of the converter 7 (to operate in boost mode or in direct battery mode) may be in response to a signal from an audio level comparator 8.

In one aspect, the power converter 7 can set an upper limit on its input supply current that may be variable in accordance with a control input (not shown.) This limit on the input supply power of the power converter might have been set based on the present state of charge of the battery 1, or based on whether or not the battery 1 is connected to a charger (not shown.) In another aspect, that limit may be set based on thermal dissipation ability of the converter 7 regardless of whether a charger is connected to the battery 1.

To supply bursts of energy to the audio amplifier A during audio peaks, an energy storage reservoir capacitor Crsrvr is provided. The latter is part of an energy reservoir circuit in which Crsrvr is series coupled with a switch S1. Note that in one aspect, Crsrvr is much larger (greater capacitance, e.g., on the order of 500 microfarads or more) than a typical ripple reduction or filter capacitor or stabilization capacitor (not shown) that may also be coupled to the output node Vbst (in parallel at the output of the power converter 7.)

When the switch S1 is closed, the reservoir capacitor is attached to the power converter. In other words, Crsrvr is now coupled in parallel with the power output (supply and return) nodes of the converter 7. The power output node Vbst is tied to or is shared by the power supply node of the audio amplifier A. When Crsrvr is attached to the power converter, it is also deemed to be coupled in parallel with the power supply and return nodes of the amplifier A, thereby being able to supply bursts of energy to power the audio amplifier A as needed.

Figure 2:
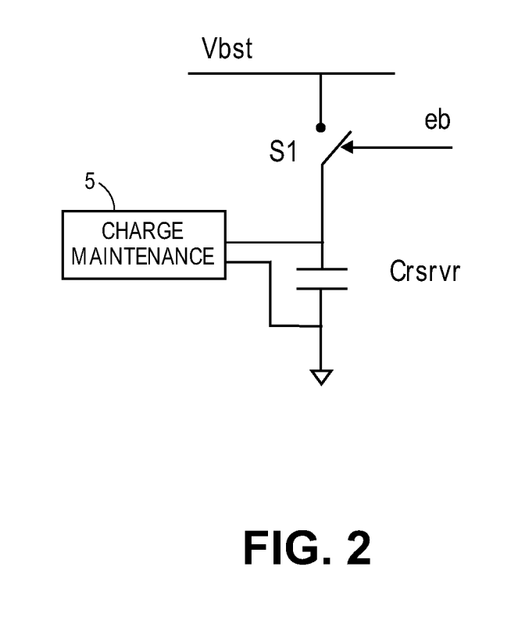
FIG. 2 is a circuit schematic of an energy storage reservoir circuit in which the reservoir capacitor is series coupled with a high side switch

When the switch S1 is open, Crsrvr becomes detached from the power supply and return nodes of the amplifier A, even though the "top" plate of Crsrvr as shown in the drawing remains tied to the power converter output node Vbst and to the power supply node of the amplifier A. This is referred to as a low side configuration, where S1 is tied to the power supply return node (e.g., ground.) An alternative is a high side configuration shown in FIG. 2 where S1 is tied to the node Vbst. In both configurations, Crsrvr is detached when S1 is open, such that it can no longer supply the audio amplifier and it cannot be charged from the output of the power converter 7 (through the node Vbst.)

A charge maintenance circuit 5 maintains a voltage across the reservoir capacitor Crsrvr while the switch S1 is open during operation of the power converter 7 in the direct battery mode. The maintained voltage across Crsrv may be a value that is greater than Vbatt, e.g., it may be a selected value that is equal in absolute value to the boosted level that is maintained by the power converter 7 during boost mode. For example, if the boosted level is selected to be +12 Vdc, then the charge maintenance circuit 5 can be configured to maintain a 12 V drop from the top plate to the bottom plate of Crsrvr, regardless of the actual voltage at Vbst. The charge maintenance circuit 5 may be implemented using a for example a charge-pump based, floating voltage regulator. The charge maintenance circuit 5 may also be disabled, where in that case it may present a high impedance to the top and bottom plates of Crsrvr such that it cannot maintain the selected charge in or the selected voltage across Crsrvr (the charge or voltage will drop due to inherent leakage in the capacitor Crsrvr.)

The switch S1, the boost converter 7, and the charge maintenance circuit 5 may be under control of the audio level comparator 8. In one aspect, the audio level comparator 8 i) signals the boost converter 7 to boost the battery voltage to the boosted level (at the node Vbst), and ii) signals the switch S1 in the energy reservoir circuit to become closed, in response to determining that a level of the audio input signal is greater than a threshold. This occurs during the boost mode of operation of the power converter 7. Note that the timing of those control signals (e.g., their assertion intervals) may be said to be contemporaneous, or set to occur for example during a given audio frame of the digital audio input signal whose level was determined to be above the threshold. The control signals are also referred to here as enable boost (eb) signals.

In another aspect, the audio level comparator 8 i) signals the boost converter 7 to be configured so that the battery directly supplies the node Vbst and the power supply node of the audio amplifier A, and ii) signals the switch S1 in the energy reservoir circuit to become open, in response to the level of the audio input signal being less than the threshold. This occurs during the direct battery mode of operation of the power converter 7.

The audio level comparator 8 may determine the level or strength of the audio input signal by computing or measuring for example a root mean square (RMS), a peak, or a peak to peak value of the audio input signal. It may be implemented as an entirely analog, level detector and comparator circuit, that may be on the same microelectronic die as the controller portion (not shown) of the boost converter 7 and the switch S1. Another possibility is to have the controller of the boost converter 7 on the same die as the switch S1, but the audio level comparator 8 is an off-chip control circuit.

In one aspect, when the boost converter 7 is to be transitioned from direct battery mode to the boost mode, the charge maintenance circuit 5 is disabled (as signaled by the audio level compactor 8) while the voltage at the boost converter output node Vbst is ramped up to the boosted level (by appropriately signaling the power converter 7 to do so) and while the switch S1 is kept open; then, once Vbst has reached the boosted level, the switch S1 is closed, and the charge maintenance circuit 5 may be kept disabled (during the boost mode of operation) because the charge in the reservoir capacitor Crsrvr is now being maintained by the power converter 7.

In another aspect, when the boost converter 7 is to be transitioned from boost mode to direct battery mode, the reservoir capacitor is first detached (switch S1 is opened), before signaling the boost converter to ramp the voltage at the node Vbst down to its lower level (e.g., about Vbatt), and then engaging the direct battery mode by, e.g., enabling a bypass path in the power converter 7.

Note that ramping of the boost converter output node voltage Vbst (up and down as needed) is more desirable than switching it abruptly, to avoid abrupt swings of the amplifier power supply voltage which can cause audio artifacts such pops or clicks. This may be done by a controller of the boost converter 7 ramping its reference voltage up which results in Vbst rising above Vbatt (during boost mode), or ramping its reference voltage down which results in Vbst being lowered to a lower level, e.g., about the present Vbatt (during direct battery or unboosted mode).

In order to control or configure the various elements of the power converter 7, the maintenance circuit 5 and the switch S1, in the ways described above, there may be multiple digital control signals, provided to them by the audio level comparator 8. These are referred to in FIG. 1 as enable boost (eb) control signals. These may be asserted in response to determining that the level of the audio input signal is greater than a threshold, and de-asserted in response to determining that the level is less than the threshold (it being understood that such comparisons may include hysteresis as needed.) A threshold setting function 10 may set the threshold, for example as a static value or a static range of values, based on predetermined knowledge or analysis of an audio signal that is input to an audio amplifier like the amplifier A that is driving a speaker like the speaker 6. The analysis may reveal that when the audio signal rises to a particular threshold, the expected amplifier output signal swing cannot be met with a nominal battery voltage. In other words, the analysis reveals that the amplifier needs more power supply voltage than can be directly provided by the battery at a nominal state of charge, in order to adequately output the audio signal when it is at the threshold level, e.g., without clipping.

The analysis may also reveal that when the audio signal level drops to below the threshold, the expected amplifier signal swing can be met with direct battery supply at the nominal battery voltage; in other words, the analysis reveals that the amplifier can adequately output the audio signal level below the threshold, e.g., without clipping, at the nominal battery voltage.

Alternatively, and as depicted in FIG. 1, the threshold setting function 10 may set the threshold as a dynamic value or a dynamic range of values, meaning that the threshold is updated as a function of each measurement of Vbatt (during playback or audio output through the amplifier A and the speaker 6). This may be done in the digital domain by a controller that is off-chip to the audio level comparator 8, and that transmits the resulting updated threshold from time to time, to the audio level comparator 8, through a chip to chip serial bus interface.

In another alternative, the functions of the threshold setting function 10 and the audio level comparator 8 may be combined and implemented by a digital controller that analyses the audio signal in digital domain and in real-time (during its playback through the speaker 6), and may compute an updated threshold for example in every frame of the digital audio input signal based on a present measurement of Vbatt, knowledge of the boosted level, and perhaps also based on a present measurement of the voltage at the node Vbst (in every frame of the audio signal.)

Figure 3:
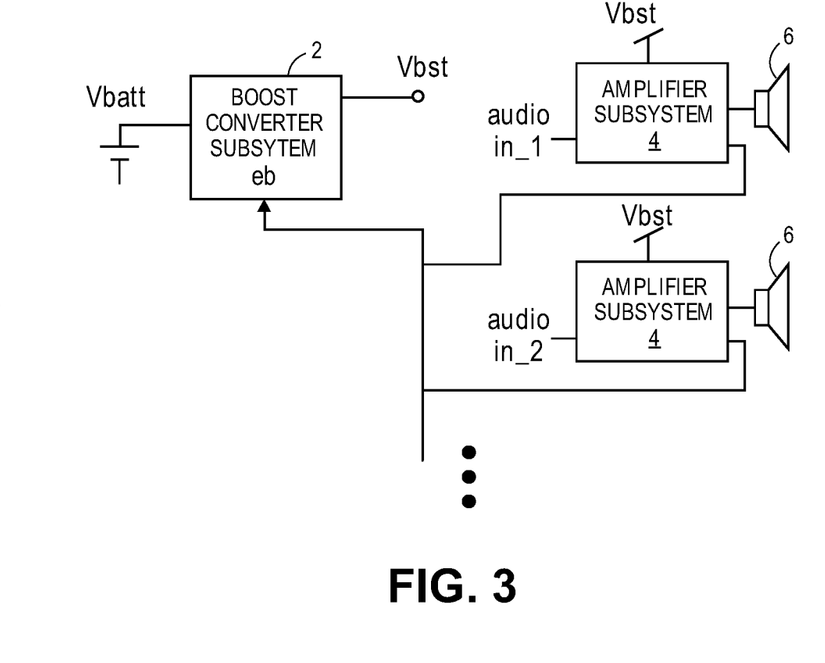
FIG. 3 is a block diagram of an audio system having multiple audio amplifiers.

Turning now to FIG. 3, this is a block diagram of an example audio system having multiple audio amplifier subsystems 4 whose power supply nodes are tied to the same node Vbst. Each amplifier subsystem 4 may have the components described above in connection with FIG. 1 including another audio amplifier A to amplify another audio input signal and another audio level comparator 8, for driving a respective speaker 6. Each respective audio level comparator i) signals a boost converter subsystem 2 to boost the battery voltage to the boosted level, and ii) signals the switch in the energy reservoir circuit to become closed, in response to determining that a level of the another audio input signal is greater than another threshold. In other words, each amplifier subsystem 4 may compare its respective audio input signal to its respective threshold. If any one of the amplifier subsystems 4 decides to signal the power converter subsystem 2 to enter boost mode, then the power converter 7 (see FIG. 1) will be so configured. In one aspect, only if all of the amplifier subsystems 4 then signal the power converter subsystem 2 to enter the direct battery mode will then the power converter 7 be so configured. Thus, in one aspect, it is sufficient condition for entering boost mode once any one of the amplifier subsystems 4 signals the need to do so, but only if all of the subsystems 4 signal for direct battery mode will then the boost converter subsystem 2 do so.

Figure 4:
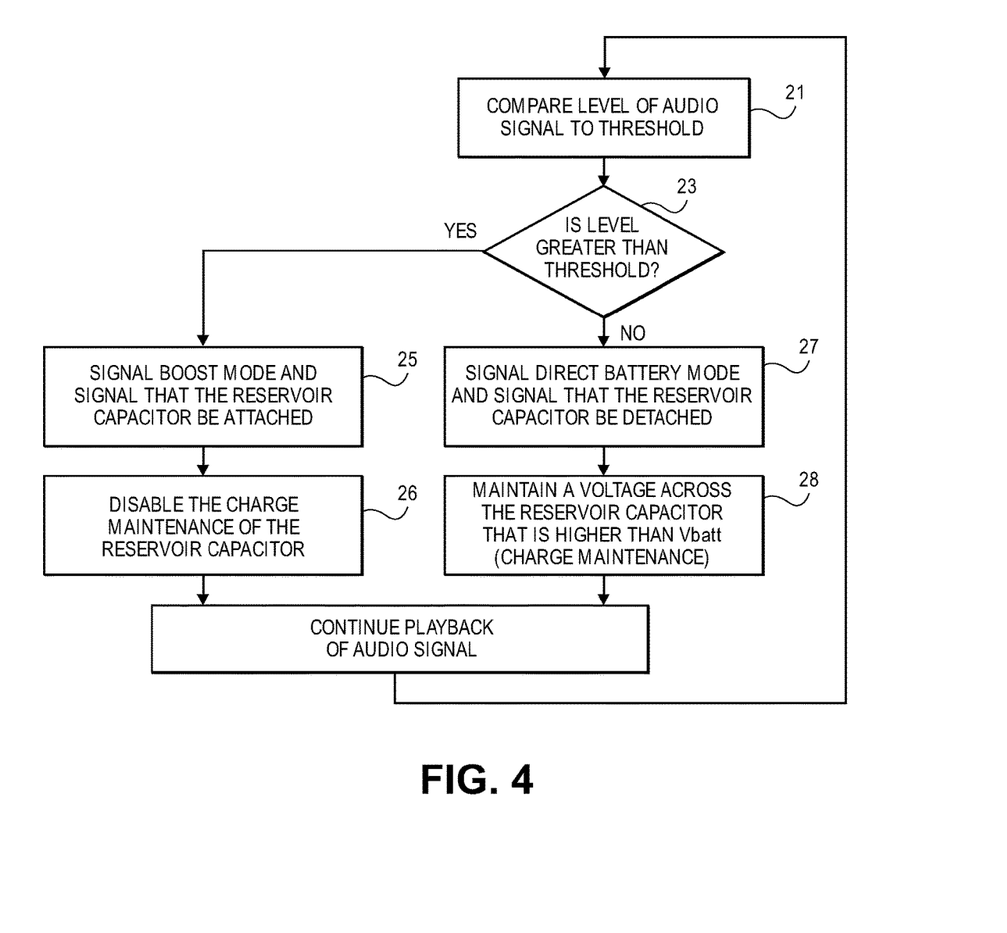
FIG. 4 is a flow diagram of a method for supplying power in an audio system.

FIG. 4 is a flow diagram of a method for supplying power in an audio system. The process depicted here maybe assumed to be taking place after an initial power up of the system has taken place, while a first input audio signal is being played back or output through a speaker. Also, although the operations are described sequentially as depicted in the figure, it should be recognized that in some instances, the actual order may be different and some operations may take place contemporaneously with others (overlap in time).

The process may begin with comparing a level of the first input audio signal to a first threshold (operation 21). As suggested above, the comparison may be performed in the digital domain or it may be performed in the analog domain, using any one of several possible measures of strength or level of an audio signal. In response to the level being greater than the first threshold (operation 23), the boost converter is signaled to boost the battery voltage to the boosted level at the power supply node of the first audio amplifier that is amplifying the first input audio signal. In addition, the energy reservoir circuit is signaled to attach the reservoir capacitor to the power supply node of the first audio amplifier (operation 25). Furthermore, the charge maintenance of the reservoir capacitor is disabled (operation 26), and playback of the audio signals continues in this configuration.

Returning to operation 23, if the level of the audio signal is less than the threshold (or not greater than the threshold), then the process continues with operation 27 in which direct battery mode is signaled, as well as that the reservoir capacitor be detached. In other words, the boost converter is signaled to not boost the battery voltage and to enable the battery to directly supply power to the first audio amplifier, while also signaling that the reservoir capacitor be detached from the power supply node of the first audio amplifier. In addition, the voltage across the reservoir capacitor is maintained higher than Vbatt (also referred to as charge maintenance mode), in operation 28. Playback of the audio signal continues in this configuration. Thus, it can be seen that the process operations depicted in FIG. 4 repeat as the playback of the audio signal continues.

In another aspect, the process of FIG. 4 may be modified to support the playback of a second audio input signal. In that case, a level of the second audio input signal is compared to a second threshold (operation 21), and in response to that level being greater than the second threshold (operation 23), the boost converter is signaled to boost the battery voltage at a power supply node of the second audio amplifier that's amplifying the second input audio signal (operation 27.) In addition, the reservoir capacitor is signaled to be attached to the power supply node of the second audio amplifier. This modification to the process reflects the situation in the audio system of FIG. 3 in which there are multiple amplifier subsystems 4 that are operating in parallel while being supplied by the same node Vbst of a boost converter subsystem 2. In such aspects, the signaling of the boost converter to not boost the battery voltage may be in response to both the level of the first audio input signal being lower than the first threshold, and the level of the second audio input signal being lower than the second threshold. In other words, the boost converter is reconfigured into direct battery mode only if both of the playback channels (the first and second audio input signals) are lower than their respective thresholds.

The process depicted in FIG. 4 illustrates the situation during audio playback that is after initial power up of the audio system. The behavior during the initial power up interval may be different, and may be as follows. In one aspect, during the initial power up interval, the boost converter 7 is first configured to boost the battery voltage while the switch S1 (see FIG. 1) is closed and while the charged maintenance circuit 5 is disabled. This results in the voltage across the reservoir capacitor rising to the boosted level (which is greater than Vbatt) as may be supplied by the output of the boost converter 7. This is referred to as the initial charging of the energy reservoir, which should occur sufficiently rapidly in order to make the audio system ready as soon as possible, and hence the desire to have boost mode enabled while the switch S1 is closed during this initial power up interval. However, after the initial power up interval, the audio system may automatically transition into a default, direct battery mode by opening the switch S1 and maintaining a higher voltage (higher than the battery voltage Vbat) across the reservoir capacitor while also ramping the voltage at node Vbst down to for example about the battery voltage. Next, the system waits until the enable boost signal is asserted by any one or more of several audio level comparators 8 which correspond to respective audio amplifiers that are being powered by the boost converter 7. In response to any of these enable boost signals being asserted, the boost converter 7 is configured so that its output node Vbst is ramped up to the boosted level while the charge maintenance circuit 5 remains disabled, and then the switch S1 is closed.

Figure 5:
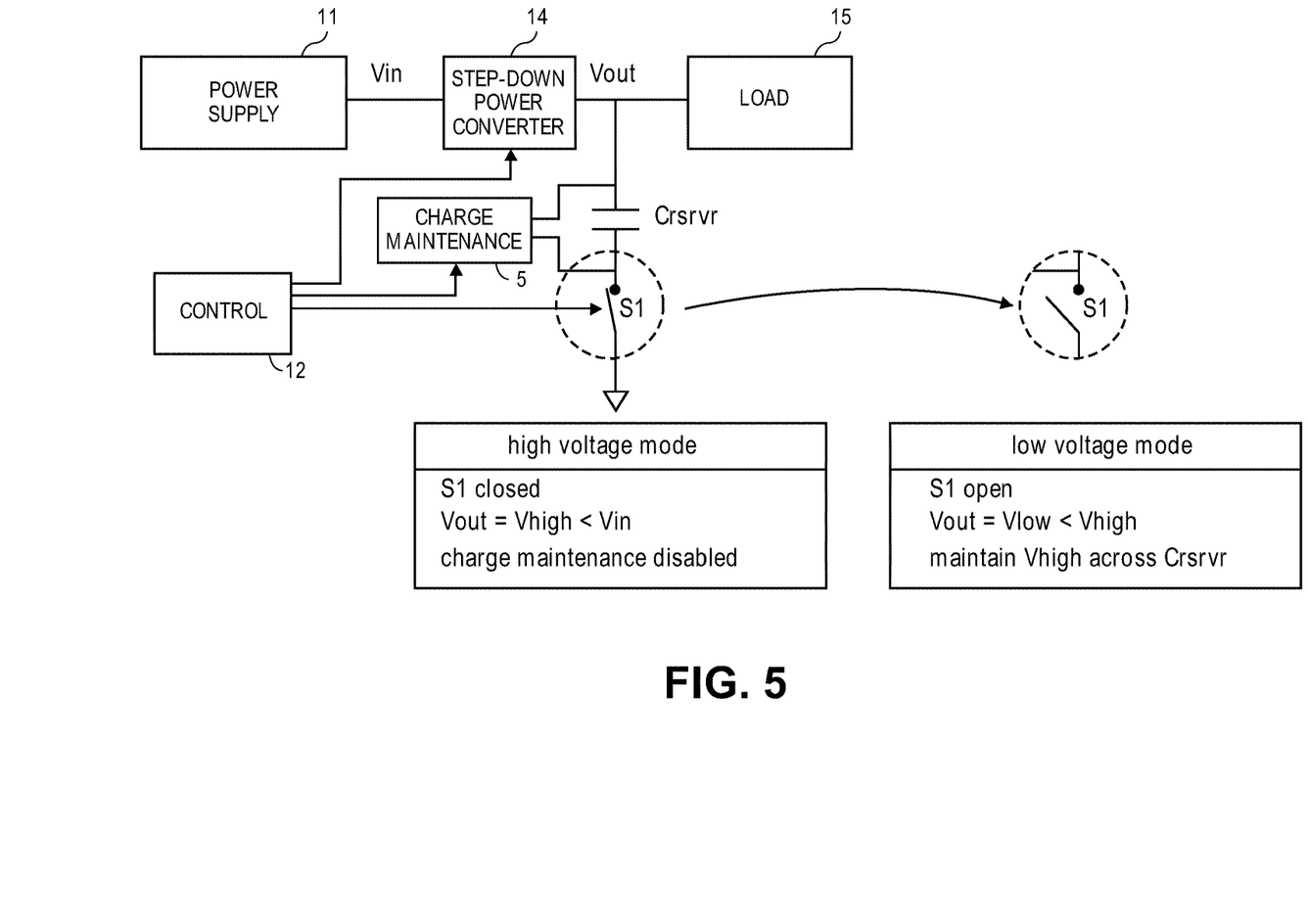
FIG. 5 is a combined block diagram and circuit schematic of an electrical system that includes a power converter and an energy storage reservoir circuit.

Turning now to FIG. 5, another aspect of the disclosure is illustrated as an electrical power converter system that has an input power node Vin coupled to draw power from a power supply 11 (e.g., a battery), and an output power node Vout. Between them a step-down power converter 14 is coupled as shown, to draw power from the power supply 11 and use it to supply power to a load 15 at the node Vout. The power converter 14 is generally configured to provide a first output voltage Vhigh (e.g., a regulated dc voltage) and a second output voltage Vlow (e.g., a regulated dc voltage), on the output power node Vout, in accordance with a control input that is governed by a control circuit 12, and where Vhigh>Vlow. The power converter 14 in the example shown is a step down converter, so that Vin>Vout in that case. The switch S1 is series coupled between i) an energy reservoir node (being common with a top plate or a bottom plate of a reservoir capacitor Crsrvr), and ii) a power supply node or a power return node. In the example shown, the switch S1 is in a low side configuration, where it is series coupled between the bottom plate of Crsrvr and ground; an alternative is a high side configuration (similar to FIG. 2) where it is series coupled between the top plate of Crsrvr and the node Vout. The charge maintenance circuit 5 is coupled to the energy reservoir node (e.g., directly to the top and bottom plates of Crsrvr as shown), and is configured to, when the switch S1 is closed, maintain a selected charge in or a selected voltage across the energy reservoir element Crsrvr. In one aspect, the charge maintenance circuit 5 compensates for the inherent charge leakage characteristics of the capacitor Crsrvr to thereby maintain the charge or voltage.

The system in FIG. 5 is able to transition the load 15 between a high supply voltage mode and a low supply voltage mode, in a power efficient manner, as follows. The control circuit 12 is configured to i) signal the switch S1 to open or close, ii) signal the power converter 14 via its control input to provide the high output voltage or the low output voltage, and iii) signal the charge maintenance circuit 5 whether or not to maintain a selected amount of charge in the energy reservoir element Crsrvr, responsive to determining that a lower or higher output power node voltage Vout is needed. As seen in FIG. 5, if a higher output node voltage Vout is needed, then S1 is closed and the step down power converter 14 drops Vin down to Vhigh and the charge maintenance circuit 5 is disabled. But if a lower output node voltage Vout is needed, then S1 is opened and the step down power converter 14 drops Vin down to Vlow while charge is maintained in Crsrvr (e.g., the voltage across the capacitor Crsrvr is kept at Vhigh.)

In one aspect, the step-down power converter 14 contains a buck voltage regulator, and the control circuit 12 is configured to i) signal the switch S1 to open, ii) signal the buck voltage regulator to change from the high output voltage to the low output voltage, and iii) signal the charge maintenance circuit 5 to maintain the selected charge, in response to the determination that the lower output power node voltage is needed. In this case, it may be more power efficient to supply the load from the lower output voltage produced by the buck (step down) voltage regulator. Also, in this case, the load 15 need not be an audio amplifier.

Staying with the aspects of FIG. 5, the control circuit 12 may be configured to i) signal the switch S1 to open, ii) signal the power converter 14 to change from the high output voltage to the low output voltage, and iii) signal the charge maintenance circuit to maintain the selected charge, in response to a determination that a lower output power node voltage is needed for the load 15. The control circuit 12 is also configured to i) signal the switch S1 to close, ii) signal the power converter 14 to change from the low output voltage to the high output voltage, and iii) signal the charge maintenance circuit 5 to not maintain the selected charge, in response to a determination that a higher output power node voltage is needed.

While certain aspects have been described and shown in the accompanying drawings, it is to be understood that such aspects are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An audio system comprising:
    a battery having a battery voltage;
    an audio amplifier having a power supply node and being configured to amplify an audio input signal;
    an energy reservoir circuit in which a reservoir capacitor is series coupled with a switch;
    a charge maintenance circuit that maintains a voltage across the reservoir capacitor while the switch is open;
    a boost converter having an input power node coupled to the battery, and an output power node coupled to the energy reservoir circuit and to the power supply node of the audio amplifier; and
    an audio level comparator that i) signals the boost converter to boost the battery voltage to a boosted level at the output power node, and ii) signals the switch in the energy reservoir circuit to become closed, in response to a level of the audio input signal being greater than a threshold.

2. The audio system claim 1 wherein the boost converter comprises a bypass path that in response to a signal from the audio level comparator enables the battery to directly supply the power supply node of the audio amplifier through the bypass path.

3. The audio system of claim 1 wherein the audio level comparator i) signals the boost converter to be configured so that the battery directly supplies the power supply node of the audio amplifier, and ii) signals the switch in the energy reservoir circuit to become open, in response to the level of the audio input signal being less than the threshold.

4. The audio system of claim 1 wherein when the boost converter is to be transitioned from a direct battery mode of operation to a boost mode of operation, the charge maintenance circuit is disabled while the boost converter output node voltage is ramped up to a boosted level while the switch is kept open.

5. The audio system of claim 1 further comprising
    another audio amplifier being configured to amplify another audio input signal, while being supplied by the power supply node; and
    another audio level comparator that i) signals the boost converter to boost the battery voltage to the boosted level, and ii) signals the switch in the energy reservoir circuit to become closed, in response to a level of the another audio input signal being greater than another threshold.

6. The audio system of claim 1 wherein during an initial power up interval, the boost converter is configured to boost the battery voltage while the switch is closed and while the charge maintenance circuit is disabled.

7. A method for supplying power in an audio system, the method comprising:

comparing a level of a first audio signal to a first threshold;

in response to the level of the first audio input signal being greater than the first threshold,
  signaling a boost converter to boost a battery voltage of a battery to a boosted level, at a power supply node of a first audio amplifier that is amplifying the first audio input signal, and signaling that a reservoir capacitor be attached to the power supply node of the first audio amplifier; and in response to the level of the first audio input signal being lower than the first threshold,
  signaling the boost converter to be configured to enable the battery to directly supply power to the first audio amplifier, and signaling that the reservoir capacitor be detached from the power supply node of the first audio amplifier.

8. The method of claim 7 further comprising
maintaining a voltage across the reservoir capacitor at the boosted level while the reservoir capacitor is detached from the first audio amplifier.

9. The method of claim 7 further comprising
comparing a level of a second audio input signal to a second threshold;

in response to the level of the second audio input signal being greater than the second threshold,
  signaling the boost converter to boost the battery voltage of the battery to the boosted level, at a power supply node of a second audio amplifier that is amplifying the second audio input signal, and signaling that the reservoir capacitor be attached to the power supply node of the second audio amplifier.

10. The method of claim 9 wherein signaling the boost converter to not boost the battery voltage is in response to both
  a) the level of the first audio input signal being lower than the first threshold, and
  b) the level of the second audio input signal being lower than the second threshold.

11. An electrical power converter system comprising:
a power converter having an input power node and output power node, and configured to provide a first output voltage and a second output voltage, on the output power node, in accordance with a control input, wherein the first output voltage is higher than the second output voltage;
a switch that is series coupled between i) an energy reservoir node and ii) a power supply node or a power return node; and
a charge maintenance circuit that is coupled to the energy reservoir node, and is configured to maintain, when the switch is closed, a selected amount of charge in or a selected voltage across an energy reservoir element that is coupled to the energy reservoir node.

12. The system of claim 11 further comprising
a control circuit that is configured to i) signal the switch to open or close, ii) signal the power converter via the control input to provide the first output voltage or the second output voltage, and iii) signal the charge maintenance circuit whether or not to maintain the selected amount of charge, responsive to determining that a lower or higher output power node voltage is needed.

13. The system of claim 12 further comprising a battery coupled to the input power node to supply power to the power converter.

14. The system of claim 12 wherein the power converter comprises a buck voltage regulator, and wherein the control circuit is configured to i) signal the switch to open, ii) signal the buck voltage regulator to change from the first output voltage to the second output voltage, and iii) signal the charge maintenance circuit to maintain the selected charge, in response to the determination that the lower output power node voltage is needed.

15. The system of claim 11 wherein the control circuit is configured to i) signal the switch to open, ii) signal the power converter to change from the first output voltage to the second output voltage, and iii) signal the charge maintenance circuit to maintain the selected charge, in response to a determination that a lower output power node voltage is needed, and
  wherein the control circuit is configured to i) signal the switch to close, ii) signal the power converter to change from the second output voltage to the first output voltage, and iii) signal the charge maintenance circuit to not maintain the selected charge, in response to a determination that a higher output power node voltage is needed.

16. The system of claim 11 further comprising
the energy reservoir element which comprises a capacitor.

17. The system of claim 11 wherein the power converter comprises a voltage boost converter.

18. The system of claim 11 wherein the power converter comprises a step down voltage regulator.

19. The system of claim 11 further comprising a battery coupled to the input power node to supply power to the power converter.

* * * * *